(12) United States Patent
Sharifi et al.

(10) Patent No.: US 12,080,293 B2
(45) Date of Patent: Sep. 3, 2024

(54) COMBINING RESPONSES FROM MULTIPLE AUTOMATED ASSISTANTS

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/378,083

(22) Filed: Oct. 9, 2023

(65) Prior Publication Data

US 2024/0038231 A1   Feb. 1, 2024

Related U.S. Application Data

(63) Continuation of application No. 17/231,333, filed on Apr. 15, 2021, now Pat. No. 11,783,828.

(51) Int. Cl.
| | |
|---|---|
| *G10L 15/22* | (2006.01) |
| *G06F 16/245* | (2019.01) |
| *G06F 16/248* | (2019.01) |
| *G10L 15/26* | (2006.01) |
| *G10L 15/30* | (2013.01) |
| *G10L 15/32* | (2013.01) |

(52) U.S. Cl.
CPC .......... *G10L 15/22* (2013.01); *G06F 16/245* (2019.01); *G06F 16/248* (2019.01); *G10L 15/26* (2013.01); *G10L 15/30* (2013.01); *G10L 15/32* (2013.01); *G10L 2015/223* (2013.01)

(58) Field of Classification Search
CPC .......... G10L 15/22; G10L 15/26; G10L 15/30
See application file for complete search history.

(56) References Cited

U.S. PATENT DOCUMENTS

| | | | |
|---|---|---|---|
| 9,801,158 B1 | 10/2017 | Yuan | |
| 10,901,520 B1* | 1/2021 | Lee | ........................ G06F 1/1694 |
| 2018/0293484 A1* | 10/2018 | Wang | .................... G06F 16/632 |
| 2021/0074299 A1* | 3/2021 | Hwang | ............. G06F 16/90332 |
| 2022/0335932 A1 | 10/2022 | Sharifi et al. | |

* cited by examiner

*Primary Examiner* — Ibrahim Siddo
(74) *Attorney, Agent, or Firm* — Gray Ice Higdon

(57) ABSTRACT

Systems and methods for determining whether to combine responses from multiple automated assistants. An automated assistant may be invoked by a user utterance, followed by a query, which is provided to a plurality of automated assistants. A first response is received from a first automated assistant and a second response is received from a second automated assistant. Based on similarity between the responses, a primary automated assistant determines whether to combine the responses into a combined response. Once the combined response has been generated, one or more actions are performed in response to the combined response.

20 Claims, 7 Drawing Sheets

COMBINING RESPONSES FROM MULTIPLE AUTOMATED ASSISTANTS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances, such as an invocation indication followed by a spoken query. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant," "OK Assistant", and/or "Assistant" can be spoken to invoke an automated assistant.

Often, a client device that includes an assistant interface includes one or more locally stored models that the client device utilizes to monitor for an occurrence of a spoken invocation phrase. Such a client device can locally process received audio data utilizing the locally stored model, and discards any audio data that does not include the spoken invocation phrase. However, when local processing of received audio data indicates an occurrence of a spoken invocation phrase, the client device will then cause that audio data and/or following audio data to be further processed by the automated assistant. For instance, if a spoken invocation phrase is "Hey, Assistant", and a user speaks "Hey, Assistant, what time is it", audio data corresponding to "what time is it" can be processed by an automated assistant based on detection of "Hey, Assistant", and utilized to provide an automated assistant response of the current time. If, on the other hand, the user simply speaks "what time is it" (without first speaking an invocation phrase or providing alternate invocation input), no response from the automated assistant will be provided as a result of "what time is it" not being preceded by an invocation phrase (or other invocation input).

SUMMARY

Techniques are described herein for combining responses that are provided by multiple automated assistants. For example, various techniques are directed to utilizing an automated assistant, which can be invoked by a user, to coordinate processing of a query by one or more other automated assistants and to at least selectively combine returned responses into a single response. For instance, the user may utter an invocation phrase, such as "OK Assistant", that invokes a primary automated assistant but that does not explicitly invoke other automated assistants with which the primary automated assistant can at least selectively interact in processing a query received in association with (e.g., immediately following, immediately preceding) the invocation phrase. Thus, the user may specify, based on providing an invocation input that is specific to the primary automated assistant, to utilize the primary automated assistant rather than invoke only one of the other automated assistants individually. For example, a first invocation phrase(s) (e.g., "OK Assistant A") can, when detected, exclusively invoke a first automated assistant and without invoking the primary automated assistant and/or any other automated assistant(s). Likewise, a second invocation phrase(s) (e.g., "OK Assistant B") when detected, can exclusively invoke a second automated assistant and without invoking the primary automated assistant and/or any other automated assistant(s). Other invocation phrase(s) (e.g., "OK Assistant") can, when detected, invoke the primary assistant. The primary assistant, when invoked, can at least selectively interact with the first automated assistant and/or the second automated assistant (i.e., "secondary assistants") in processing input(s) provided in association with the invocation. In some implementations, the primary assistant may be a "meta assistant" that can always interact with one or both of the first automated assistant and second automated assistant and can itself lack one or more automated assistant capabilities such as speech recognition, natural language understanding, and/or fulfilment capabilities. In other instances, the primary automated assistant can both interact with the secondary assistants while also performing its own query processing to determine responses to a query.

A primary automated assistant can provide a query uttered by the user to a first assistant, which can provide a first response to the query, and to a second assistant that can provide a second response to the query. The primary assistant can then determine, based on the first response and the second response, whether to combine at least a portion of the first response and the second response. When the primary assistant determines to combine, it can combine at least portions of the first and second responses, and cause one or more actions to be performed based on the combined response. For example, a combined response may be audibly provided to the user via one or more client devices that are executing a client application for the primary automated assistant. When the primary automated assistant determines not to combine at least portions of the first response and the second response, the primary automated assistant can cause action(s) to be performed based on only one of the first response and the second response.

Thus, utilization of techniques described herein mitigates the need of a user to explicitly invoke each of multiple automated assistants to determine, from each of the automated assistants, a response to a query that the user has interest in being provided. This can make the overall duration of the user/assistant(s) interaction more efficient. Further, by querying multiple automated assistants and combining the responses into a single response, the combined response can be more robust than a response provided by a single automated assistant. Despite being more robust, the combined response can be combined utilizing techniques that make the combined response more concise than the responses collectively, enabling the combined response to be rendered more quickly and reducing the overall duration of the interaction with the assistant. Yet further, the combined response mitigates the need for the user to prolong the overall duration of the interaction via a follow-up query to get a more complete response. Even further, implementations only combine responses selectively and responsive to determining that the responses should be combined. As described herein, such a determination can be based on factor(s) that seek to prevent combining of responses when doing so is objectively determined to not provide a threshold degree of information gain and/or other threshold degree of improvement relative to only one of the responses standing alone. Accordingly, those implementations seek to combine responses only when doing so will provide objective improvement, while otherwise providing only a single response (that can be more quickly conveyed enabling the interaction to conclude more quickly).

In some implementations, the first assistant and the second assistant can both be configured to be invoked by the same invocation phrase and the primary assistant can receive the responses from one or more secondary assistants (e.g., a first response from the first assistant and a second response from the second assistant). For example, the first automated assistant and the second automated assistant may be configured to be invoked by the phrase "OK Assistant," and each can process the query that follows the invocation phrase. The first and second automated assistants can then send the query responses to the primary automated assistant, which can determine whether to combine the responses and cause one or more actions to be performed in response to generating a combined response.

In some instances, invocation of an automated assistant can include an uttered phrase and/or one or more gestures performed by a user in proximity to one or more automated assistants. For example, as previously described, one or more automated assistants may be invoked with an invocation phrase, such as "OK Assistant." Additionally or alternatively, a user may perform a gesture to invoke an automated assistant, such as by looking at a device executing an automated assistant, making a waving motion that is visible to one or more image capture devices of a device that is executing an automated assistant, and/or other body motions that may be indicative of interest in the user to invoke an automated assistant. In some implementations, one or more other actions may be utilized to invoke an assistant, such as physical interaction with a device that is in communication with an automated assistant (e.g., touching a screen, pressing a button).

In some implementations, an automated assistant can be invoked and can provide the query to other automated assistants for processing while additionally processing the query and determining its own response. For example, a first automated assistant may be designated as the primary automated assistant that is tasked with providing a query to other automated assistants, determining whether to combine responses, and perform one or more actions based on determining to combine the results. In addition to receiving response(s) from other automated assistant(s), the primary automated assistant may additionally process the query and determine its own response. The primary automated assistant can then determine whether to combine its own response with response(s) from other automated assistant(s) or to instead use only its own response or only one of the response(s) from the other automated assistant(s).

In some instances, the primary assistant can process only particular types of commands and/or queries from the user. For example, an invoked automated assistant can be configured only to process request(s) having certain intent(s), such as intent(s) that are related to playing music (e.g., "Change the song," "Volume up," "Stop"), but to not process other queries not having those intent(s) (e.g. "What is the weather"). In instances where a query is received that is not within the functional limitations of the invoked automated assistant, the invoked automated assistant may not process the query but may instead operate as a meta assistant that can provide the query to other automated assistants, receive responses, and determine whether to combine the received responses into a combined response. In those instances, although the invoked automated assistant can process some queries, it can determine that a useful response is unlikely to originate from the invoked automated assistant.

In some implementations, an automated assistant may be designated as the primary automated assistant when a user utters an assistant invocation based on the current or past interactions of the user with one or more of the automated assistants. For example, in some instances, an automated assistant that is executing on a device that is closest to the user may be designated as the primary automated assistant. The device that is closest to the user can be determined using, for example, one or more arbitration techniques, and multiple automated assistants on multiple difference devices can communicate with one another in performing the arbitration. In some instances, the primary automated assistant can be designated based on inferred user preferences, such as the assistant used most often (e.g., explicitly and exclusively invoked most often) or the assistant that the user tends to utilize to process particular types of queries. For example, a user may tend to utilize a first assistant when asking for weather-related information and a second automated assistant when asking for schedule-related information. If the user invokes an assistant, the first automated assistant may be designated as the primary automated assistant for the query "What is the weather today" and the second automated assistant may be designated as the primary automated assistant for the query "What is on my calendar today." In some implementations, the query may include one or more terms that indicate which automated assistant is more likely to respond with the most pertinent information. For example, for the query "How much is a phone from Company A," and an automated assistant that is manufactured by Company A may be designated as the primary assistant based on likelihood that the automated assistant of Company A has a better response to the query than an automated assistant that is manufactured by another company.

In some implementations, the device designated as the primary automated assistant may be determined based on the user that utters the invocation phrase. For example, a first user may have previously indicated a preference for a particular automated assistant. When that user utters the invocation phrase, the voice of the user may be identified and a profile associated with the user may indicate which automated assistant to designate as the primary automated assistant. Likewise, a second user may designate a second automated assistant as the preferential automated assistant and that preferred automated assistant can be designated as the primary automated assistant.

In some implementations, an automated assistant may not be capable of determining answers for a particular query. In instances where the query is specific to a particular automated assistant and/or is not able to be handled by one of the automated assistants, an automated assistant that can handle the query may be designated as the primary assistant. For example, an automated assistant may be capable of processing only queries related to playing music (e.g., "turn up the volume") but cannot process the query "What is the weather." If the query is "What is the weather," an automated assistant that can determine a response may be selected as the primary automated assistant instead of an automated assistant that cannot process the query.

In some implementations, the primary automated assistant may be executing on a first device and one or more other automated assistants may be operating on different devices. For example, a primary automated assistant may be executing on a smartphone and a second automated assistant may be executing on a smart speaker that is positioned in proximity to the user and the smartphone. In some implementations, multiple automated assistants may be executing on the same device. For example, a smartphone may be executing both Assistant A and Assistant B, one of which may be designated the primary automated assistant, as described herein.

In instances where multiple automated assistants are executing on the same device, the automated assistants may share one or more resources and/or processes. For example, two automated assistants executing on the same device may share automatic speech recognition (ASR) processes such that audio may be processed into text one time, and the resulting text may then be utilized by each of the multiple assistants executing on the device. In some implementations, a first device can capture the audio that includes the query, perform ASR, and send an indication of the ASR results (i.e., a textual representation of the query) to one or more other automated assistants that are executing on other devices. For example, the primary automated assistant can generate text based on audio data using ASR, and send the text to one or more secondary automated assistants executing on different devices.

The primary automated assistant can receive responses from one or more automated assistants, including generating its own automated response. The responses may be received, for example, via ultrasonic or other wireless communication between devices, APIs of the primary automated assistant and secondary assistants, and/or other techniques for providing a response to the primary automated assistant. In some implementations, a response may be received by the primary automated assistant with a confidence score that is indicative of confidence that the response is responsive to the query, as determined by the sending automated assistant. Thus, when determining whether to combine responses, the primary automated assistant has additional information regarding whether a response is responsive enough to a query to be included in the combined response.

Once multiple responses have been received (both from other automated assistants as well as the response generated by the primary automated assistant in instances where the primary automated assistant can fully process queries), the primary automated assistant may determine whether to combine one or more of the responses into a combined response. The combined response may include any or all of the information included in the individual responses to a query. As an example, a user can invoke a meta assistant with the phrase "OK Meta Assistant" followed by the query "Is Movie A a good movie?" The meta assistant can provide the query to a first automated assistant, which can generate the response "Website 1 says Movie A is 4 out of 5 stars." Further, the meta assistant can provide the query to a second automated assistant, which can generate the response "Website 2 says Movie A is rated at 93%." The meta assistant can determine whether to combine the responses. If the meta assistant determines to combine the responses, it can generate a combined response of "Website 1 says Movie A is 4 out of 5 stars and Website 2 says Movie A is rated at 93%." For example, the meta assistant can utilize one or more text summarization techniques in generating the combined response. For instance, the meta assistant can process all or portions of the two responses, using a sequence to sequence machine learning model trained for text summarization, and utilize a generated output sequence (from the processing) as the combined response.

Alternatively, the primary automated assistant can determine not to combine the responses of the automated assistants and/or may determine that one or more of the responses should not be used in a combined response. For example, a first response can be received with a first confidence score and a second response can be received with a second confidence score, and the primary automated assistant can determine, based on the first and second scores, not to use the first response but to use the second response. For instance, the primary automated assistant can determine not to use the first response based on the first confidence score failing to satisfy a threshold (e.g., a general threshold or one particular to the automated assistant that provided the first response) and/or being less indicative of confidence than the second confidence score. The primary automated assistant can determine to use the second response based on the second confidence score satisfying a threshold (e.g., a general threshold or one particular to the automated assistant that provided the second response) and/or being more indicative of confidence than the first confidence score. In some implementations, the primary automated assistant can determine to provide a response that is independent of any response from a secondary automated assistant based on the secondary automated assistant not providing a response within a threshold time and/or providing an indication that the secondary automated assistant will not be providing a response that may be utilized by the primary automated assistant to generate a combined response.

In some implementations, the primary automated assistant can determine whether to combine the responses based on comparing the responses. For example, two responses can be compared to generate similarity metric(s) that indicate a degree of similarity between the responses and the responses combined only if the similarity metric fails to satisfy a threshold (indicating the responses are dissimilar). Otherwise, only one of the responses can be provided without providing the other responses. In these and other manners, the primary automated assistant can provide a combined response when doing so is likely to provide additional information (as indicated by the similarity metric(s) indicating the responses as dissimilar), while only providing a single of the responses when combining is unlikely to provide additional information. In some implementations of determining whether to combine responses, the primary automated assistant clusters the received responses that include similar information. Each response can be embedded in a vector space (e.g., using "word2vec" or other techniques) based on processing the information, that is included in the response, using one or more embedding machine learning models (e.g., a trained encoder neural network). Once the responses are represented as vectors, the primary automated assistant can identify similar responses based on similarity of the vectors in the vector space. For example, a first automated assistant can determine a response of "The current temperature is 55 degrees" and a second assistant may determine a response of "The weather right now is sunny and around 55 degrees." Because the two responses include similar information (e.g., a current temperature), the vectors representing the two responses will likely be located near each other in vector space and therefore include similar information. In instances where two responses include the same or nearly the same information (e.g., both including a temperature), one of the responses may be selected based on, for example, the comparative length of the responses, the response with the highest confidence score, and/or one or more other factors that are different for each of the otherwise similar responses.

In some implementations, the primary assistant can pre-process the responses before clustering. For example, the primary assistant can split a response into multiple portions, each of which can include a separate piece of information. Thus, for a given response, similarity between portions of responses can be determined and utilized to cluster the response portions based on what information in the responses is similar and which portions include different information.

As an example, for the query "What is the current weather," a first automated assistant can generate a response of "It is currently 55 degrees" and a second automated assistant may generate a response of "The weather is sunny and 55 degrees." The primary automated assistant can split the second response into two different portions (e.g., "Sunny" and "55 degrees") before clustering the responses, with one cluster including "It is currently 55 degrees" from the first response and "55 degrees" from the second response. A second cluster can include only the remaining portion of the second response (i.e., "Sunny"). Based on the clustering, the primary assistant can determine whether to combine the responses and/or which responses are to be included in the combined response.

The primary automated assistant can score each cluster to determine a confidence score for each cluster that is indicative of the likelihood that the responses of the cluster are responsive to the query. For example, the primary automated assistant can receive confidence scores with the responses from the secondary automated assistants and a confidence score can be determined for a cluster based on the confidence scores of the responses that are part of the cluster. If the score for a cluster satisfies a threshold, the responses of the cluster can be combined into a single response. For example, a high scoring cluster can include the responses of "The temperature today is 55" and "The temperature today is 57 degrees," each with a high confidence score. The responses can be combined into a response of "The temperature today is between 55 and 57" or a response of "The temperature today is around 56 degrees" (e.g., an average of the received responses).

In some implementations, the primary automated assistant can combine responses only when the confidence score of a cluster exceeds the threshold of one or more of the individual responses. For example, a first response can have a confidence score of 0.95 and a cluster of responses may have a determined confidence score of 0.94. Because the confidence in the individual response exceeds the confidence score of the clustered response(s), the primary automated assistant can determine not to combine the responses and instead provide the response with the highest confidence score.

In some implementations, multiple clusters can have confidence scores that satisfy a threshold. Because each cluster likely includes dissimilar but responsive information in the responses of the cluster, two or more clusters can be combined so that the combined response includes more information than any of the responses alone. For example, for a query of "What is the weather," a first automated assistant can respond with a result of "The temperature is 55 degrees," a second automated assistant can respond with a result of "The temperature is 60 degrees," and a third automated assistant can respond with "It is sunny today." The first two responses, which include similar information, can be clustered together. The third response, which includes other, but responsive, information, can be clustered separately (in a cluster by itself). If both clusters have a high confidence of being responsive to the query, information from the first cluster can be combined with information from the second cluster. Thus, a combined response of "The weather is sunny with a temperature between 55 and 60 degrees" can be generated and provided.

In some implementations, the confidence scores for clusters may be utilized to determine how to order and/or otherwise generate the combined response. In some instances, a cluster that has a higher confidence score can be provided more prominently in the response. For example, a response cluster with a higher confidence score can be provided first in the combined response, with other responses provided after the portion with the highest confidence score. Also, for example, the generated combined response can include a portion of a response generated from a cluster with a higher confidence score with more detail than portions generated from other clusters with lower confidence scores.

In some implementations, the combined response can be provided to the user by one of the automated assistants, either the primary automated assistant or one of the secondary automated assistants. For example, when one of the automated assistants is selected as the primary automated assistant, that assistant can provide a combined response that includes information from multiple automated assistants. In some implementations, the combined response can be provided by multiple automated assistants. For example, the primary automated assistant may be invoked with the phrase "OK Assistant" followed by a query. The automated assistants that generated responses to the query can each provide a portion of the response such that the user knows which assistant provided what information based on the device or assistant residing on a device that provided each portion of the response. In some implementations, one of the automated assistants can provide the combined results with indications as to which of the assistants provided what portion of the response. For example, "Assistant 1 says" can precede the portion of the response attributable to a first assistant and "Assistant 2 says" can precede the portion of the response attributable to a second assistant. As another example, a sound effect attributable to the first assistant can precede and/or overlay the portion of the response attributable to the first assistant and a different sound effect attributable to the second assistant can precede the portion of the response attributable to the second response. As yet another example, the portion of the response attributable to the first assistant can be rendered with a first synthesized voice and the portion of the response attributable to the second assistant can be rendered with a second synthesized voice. The first and second synthesized voices can have different voice characteristics (e.g., prosodic characteristic(s)) and, optionally, the first synthesized voice can be one reserved for use only by the first assistant and the second synthesized voice can be one reserved for use only by the second assistant. In some implementations, the user can additionally or alternatively be provided, prior to rendering of a combined response, with one or more indications that indicate which automated assistants are processing a query. For example, in response to the primary automated assistant providing the query to a first secondary assistant and a second secondary assistant, a sound effect attributable to the first secondary assistant can be rendered and a sound effect attributable to the second secondary assistant can be rendered. These sound effects can be rendered prior to the combined response (if any) and potentially prior to even generation of the combined response.

In some implementations, the combined response can be provided to a user as a spoken response from one or more of the automated assistants. In some implementations, the combined response can include other tasks or actions that are performed by one or more of the automated assistants. For example, for a query regarding a location, the combined response can include a first response, from a first automated assistant, that causes a webpage for the location to be automatically navigated to in a browser application and/or that causes a graphical element to be rendered that, when selected, causes the webpage for the location to be navigated to in the browser application. The combined response can also include a second response, from a second automated assistant, that causes a mapping application to be launched in a state that provides directions to the location and/or that causes a graphical element to be rendered that, when selected, causes the mapping application to be launched in the state. Other examples of actions that may be performed by one or more automated assistants in response to a generated combined response include making a phone call, displaying information via an interface, causing one or more other devices to perform an action (e.g., turning on a smart lightbulb or other smart device), and/or other actions that an automated assistant can be configured to perform.

In some implementations, the spoken response may include information and/or be presented such that the user has an indication of what automated assistant determined each portion of the combined response. For example, if the response was generated using only a single automated assistant response, the response can be provided utilizing the text-to-speech (US) module of that automated assistant so that the response is provided to the user with the same voice as the automated assistant that generated the response. Also, for example, in instances where the response is a combined response that includes portions from multiple automated assistants, a US module may be utilized that is different from the voice of any of the automated assistants that generated responses. Also, for example, the user may be provided with an indication of which automated assistant provided each portion of the response (e.g., "Assistant 1 says the weather is sunny and Assistant 2 says that it will rain today"). Also, for example, the automated assistant voice that contributed more significantly to the combined response (e.g., the automated assistant that provided the longer portion of the combined response) can be utilized to provide the entire response.

In some implementations, one or more portions of the combined response can be provided to the user via a device that is associated with each automated assistant. For example, a first portion, of the combined response, of "The temperature is 55 degrees" can be provided via a device that is executing a first automated assistant. A second portion, of the combined response, of "The weather is sunny" can be provided via a second device that is executing a second automated assistant that generated that portion of the response. In some implementations, the primary automated assistant can coordinate with the secondary automated assistants to present the combined response in an orderly manner. For example, the primary automated assistant can send an indication to a first automated assistant to provide its portion of the response, followed by the first automated assistant providing an indication to the primary automated assistant that it has completed providing the response (or the primary automated assistant determining, based on audio analysis, that the first automated assistant has completed providing the response). The primary automated assistant can then send an indication to the second automated assistant to provide its portion of the response, followed by sending an indication to the primary automated assistant that it has completed providing its response.

The above description is provided as an overview of some implementations of the present disclosure. Further description of those implementations, and other implementations, are described in more detail below.

DETAILED DESCRIPTION

Figure 1:
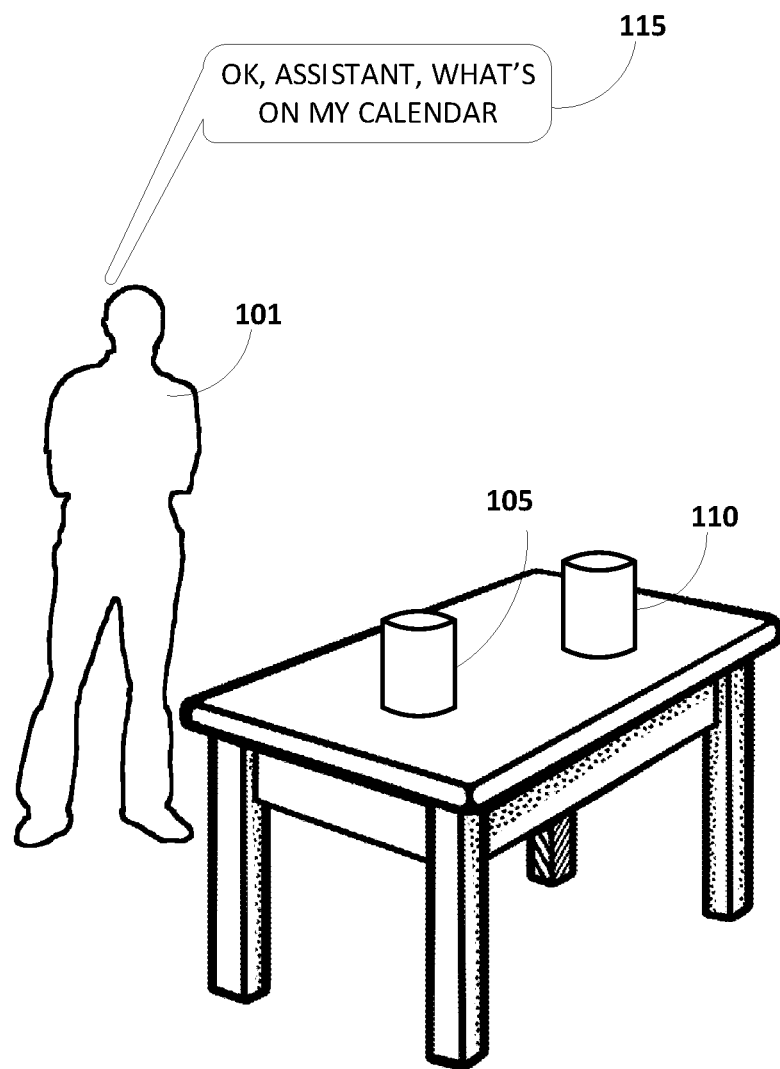
FIG. 1 is an illustration of an example environment in which implementations disclosed herein can be implemented.

Referring to FIG. 1, an example environment is provided which includes multiple automated assistants that may be invoked by a user 101. The environment includes a first standalone interactive speaker 105 with a microphone (not depicted) and a second standalone interactive speaker 110 with a microphone (also not depicted). The first speaker may be executing, at least in part, a first automated assistant that may be invoked with an invocation phrase. The second speaker 110 may be executing a second automated assistant that may be invoked with an invocation phrase, either the same invocation phrase as the first automated assistant or a different phrase to allow the user, based on the phrase uttered, to select which automated assistant to invoke. In the example environment, the user 101 is speaking a spoken utterance 115 of "OK Assistant, What's on my calendar" in proximity to the first speaker 105 and the second speaker 110. If one of the first and/or second automated assistants is configured to be invoked by the phrase "OK Assistant," the invoked assistant may process the query that follows the invocation phrase (i.e., "What's on my calendar").

Figure 2:
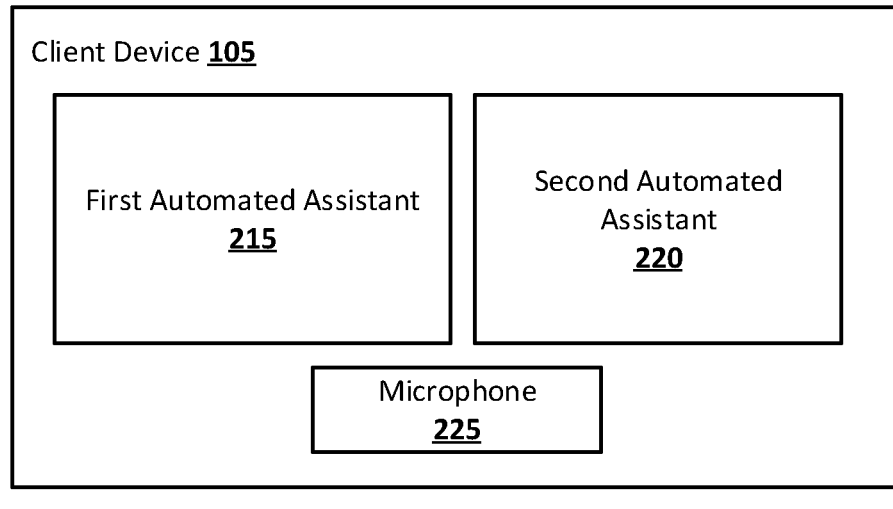
FIG. 2 is a block diagram of an example environment in which various methods disclosed herein can be implemented.
Figure 2:
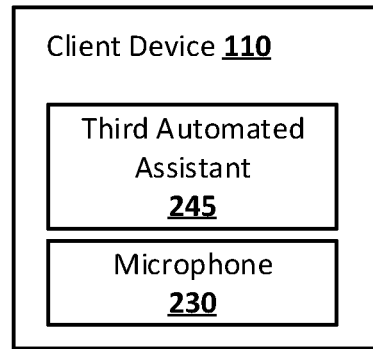

In some implementations, a device, such as first speaker 105, may be executing multiple automated assistants. Referring to FIG. 2, an example environment is illustrated that includes multiple client devices executing multiple automated assistants. The system includes a first client device 105 that is executing a first automated assistant 215 and a second automated assistant 220. Each of the first and second automated assistants may be invoked by uttering an invocation phrase (unique to each assistant or the same phrase to invoke both assistants) proximate to the client device 105 such that the audio may be captured by a microphone 225 of client device 105. For example, user 101 may invoke the first automated assistant 215 by uttering "OK Assistant 1" in proximity to the client device 105, and further invoke the second automated assistant 220 by uttering the phrase "OK Assistant 2" in proximity to client device 105. Based on which invocation phrase is uttered, the user can indicate which of the multiple assistants that are executing on the client device 105 that the user has interest in processing a spoken query. The example environment further includes a second client device 110 that is executing a third automated assistant 245. The third automated assistant may be configured to be invoked using a third invocation phrase, such as "OK Assistant 3" such that it may be captured by microphone 230. In some implementations, one or more of the automated assistants of FIG. 2 may be absent. Further, the example environment may include additional automated assistants that are not present in FIG. 2. For example, the system may include a third device executing additional automated assistants and/or client device 110 and/or client device 105 may be executing additional automated assistants and/or fewer automated assistants than illustrated.

Each of the automated assistants 215, 220, and 245 can include one or more components of the automated assistant described herein. For example, automated assistant 215 may include its own speech capture component to process incoming queries, visual capture component to process incoming visual data, hotword detection engine, and/or other components. In some implementations, automated assistants that are executing on the same device, such as automated assistants 215 and 220, can share one or more components that may be utilized by both of the automated assistants. For example, automated assistant 315 and automated assistant 320 may share an on-device speech recognizer, on-device NLU engine, and/or one or more of the other components.

Figure 3:
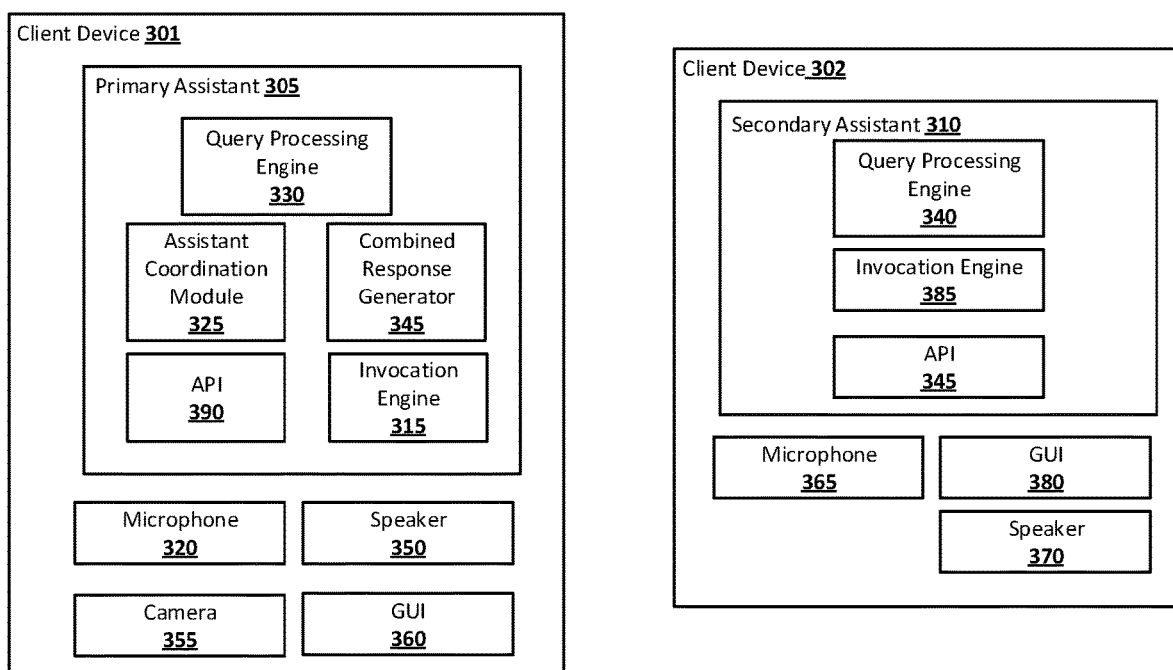
FIG. 3 is a block diagram of another example environment in which various methods disclosed herein can be implemented.

In some implementations, one or more of the automated assistants may be invoked by a general invocation phrase, such as "OK Assistant," that does not individually invoke any of the other automated assistants separately. When the user utters a general invocation phrase, one or more of the automated assistants may function as a primary automated assistant and coordinate responses between the other automated assistants. Referring to FIG. 3, a primary automated assistant 305 is illustrated along with a secondary assistant 310. The primary automated assistant may be invoked with the phrase "OK Assistant" or another general invocation phrase, which may indicate that the user has interest in providing a query to multiple automated assistants. Invocation engine 315 is operable to detect one or more spoken invocation phrases, and invoke the primary automated assistant 305 in response to detecting one of the spoken invocation phrases. For example, the invocation engine 315 can invoke the primary automated assistant 305 in response to detecting a spoken invocation phrase such as "Hey Assistant," "OK Assistant", and/or "Assistant". The invocation engine 315 can continuously process (e.g., if not in an "inactive" mode) a stream of audio data frames that are based on output from one or more microphones 320 of the client device 301, to monitor for an occurrence of a spoken invocation phrase. While monitoring for the occurrence of the spoken invocation phrase, the invocation engine 315 discards (e.g., after temporary storage in a buffer) any audio data frames that do not include the spoken invocation phrase. However, when the invocation engine 315 detects an occurrence of a spoken invocation phrase in processed audio data frames, the invocation engine 315 can invoke the automated assistant 305.

The components of automated assistant 305 and 310 are optional, and can include, for example, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client devices 301 and 302 may be relatively constrained in terms of computing resources (e.g., processor cycles, memory, battery, etc.), the local components may have limited functionality relative to any counterparts that are included in any cloud-based automated assistant components that are executing remotely in conjunction with the automated assistant(s).

In some implementations, one or more of the automated assistants may be invoked by one or more gestures that indicate that the user has interest in interacting with the primary automated assistant. For example, a user may demonstrate intention to invoke an automated assistant by interacting with a device, such as pressing a button or a touchscreen, perform a movement that is visible and may be captured by an image capture device, such as camera 355, and/or may look at a device such that the image capture device can recognize the user movement and/or positioning. When a user performs a gesture or action, the automated assistant may be invoked and begin capturing audio data that follows the gesture or action, as described above.

In some implementations, one automated assistant may be selected as the primary assistant and one or more other automated assistants may be designated as the secondary assistant(s). For example, a user can utter an invocation phrase that is common to multiple automated assistants that are proximate to the user. One or more components can determine which of the plurality of devices that are executing the automated assistants is the closest to the user and that closest automated assistant may be designated as the primary automated assistant, with the other automated assistants being designated as the secondary assistants. Also, for example, when a user invokes an automated assistant, one or more components may determine which automated assistant has been utilized most frequently by the user and designate that automated assistant as the primary automated assistant.

In some implementations, the user can invoke a particular automated assistant with an invocation phrase that is unique to that automated assistant, and that automated assistant may be designated as the primary automated assistant. For example, a user may utter the invocation phrase "OK Assistant 1" to invoke a first assistant that is then designated as the primary automated assistant. Other automated assistants can then be invoked by the primary automated assistant, be provided a query by the primary automated assistant, and/or can receive responses from other automated assistants, as described herein.

In some implementations, one or more automated assistants 305 and 310 may share one or more modules, such as a natural language processor and/or the results of a natural language, TTS, and/or STT processor. For example, referring again to FIG. 2, both first automated assistant 215 and second automated assistant 220 may share natural language processing so that, when client device 105 receives audio data, the audio data is processed once into text that may then be provided to both automated assistants 215 and 220. Also, for example, one or more components of client device 105 may process audio data into text and provide the textual representation of the audio data to third automated assistant 245, as further described herein. In some implementations, the audio data may not be processed into text and may instead be provided to one or more of the automated assistants as raw audio data.

A user may utter a query after uttering an invocation phrase, indicating that the user has interest in receiving a response to the query from a primary automated assistant. In some implementations, the user may utter a query before or in the middle of an invocation phrase, such as "What is the weather, Assistant" and/or "What is the weather today, Assistant, and what is the weather tomorrow." In some implementations, the primary automated assistant may be a meta automated assistant that is tasked with coordinating responses from other automated assistants without itself generating a response. In some implementations, the primary automated assistant may also generate its own response to a query as well as coordinate the responses received from other automated assistants, such as secondary automated assistant 310. As illustrated, the primary automated assistant 305 includes a query processing engine 330. However, in some implementations, the primary automated assistant 305 may not include a query processing engine 330 and/or may have a query processing engine 330 that only processes certain types of queries. For example, primary assistant 305 may include a query processing engine 330 that can process queries related to music being played (e.g., "Who is the current singer" and/or "Change to the next song") but may not be capable of processing queries that are not related to the currently playing music (e.g., "What is the weather").

The primary automated assistant 305 can provide the uttered query to secondary assistant 310 (and any other secondary assistants), which then can process the query to determine a response utilizing the query processing engine 340. In some implementations, the primary automated assistant may provide the query as audio data to the secondary automated assistant 310 via an application programming interface (API) 345. In some implementations, primary automated assistant 305 may first process the audio data to generate text which may then be provided to the secondary automated assistant 310 via API 345. In some implementations, primary automated assistant 305 may provide the audio data and/or a textual transcription of the query via speaker 350. For example, primary automated assistant 305 may generate an ultrasonic signal that is inaudible to humans that may be captured by microphone 365. This signal may be, for example, a processed version of the audio data that includes the query (e.g., the raw audio data processed to a higher frequency and/or a textual representation of the audio data that is transmitted via speaker 350 but inaudible to humans).

In some implementations, both the primary automated assistant 305 and secondary assistant 310 can be invoked by the same invocation phrase. For example, invocation engine 385 may be activated when audio data captured by microphone 365 as it is being captured such that both invocation engine 315 and invocation engine 385 may both be invoked with "OK Assistant" to allow both client device 301 and client device 302 to capture the audio data after invoking both automated assistants. Primary automated assistant 305 can then process the audio data and determine a response to the query utilizing query processing engine 325 to determine a first response, and secondary automated assistant 310 may separately process the audio data and determine a response utilizing query processing engine 340. Secondary automated assistant 310 can provide its response to primary automated assistant 305, such as by sending an inaudible indication of the response that can be captured by microphone 320 of client device 301 and/or by providing the response to the primary automated assistant 305 via API 390.

Figure 4A:
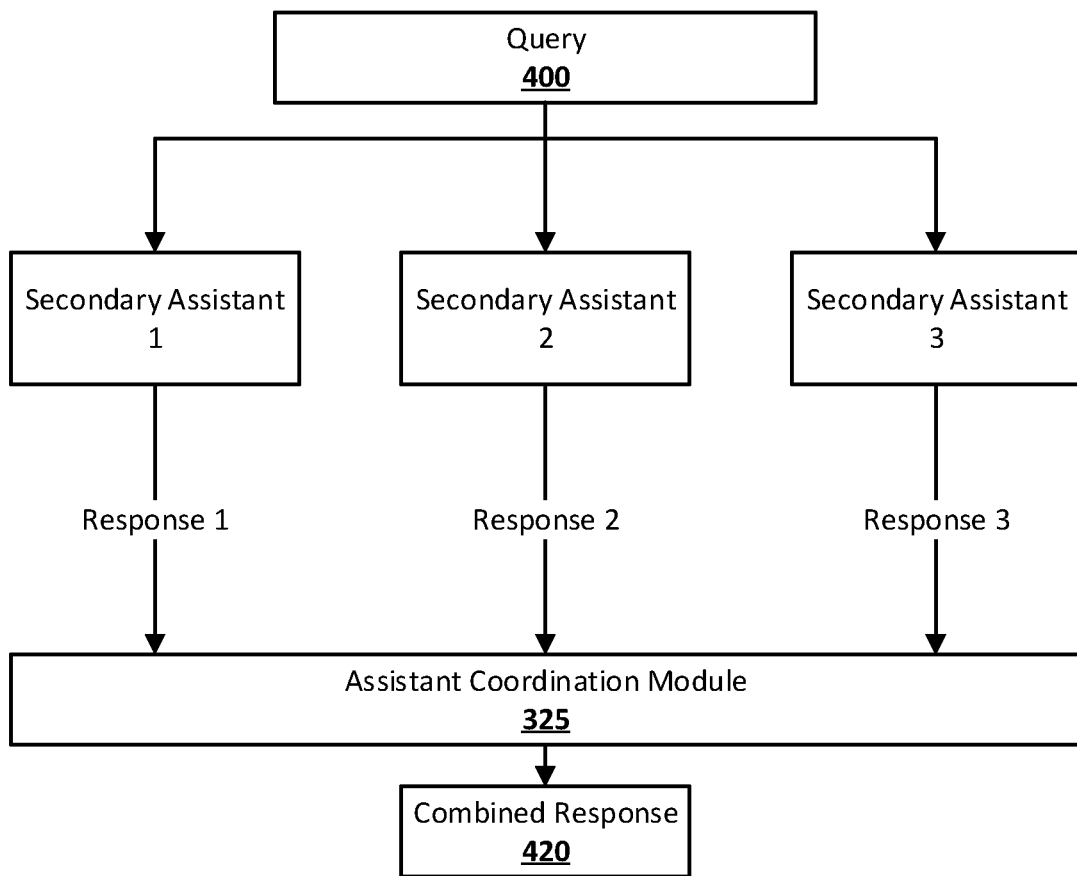
FIG. 4A is a flowchart illustrating providing queries to multiple automated assistants to generate a combined response.

Once the primary automated assistant 305 has received multiple responses (including, in some instances, a response generated by query processing engine 330), assistant coordination module 325 may determine whether to combine the responses into a combined response. Referring to FIG. 4A, multiple responses that may be provided to primary automated assistant 305 are illustrated. Each of the responses may be determined by a separate query processing engine, such as query processing engine 330 and/or query processing engine 340. As illustrated, the query 400 is provided to three secondary automated assistants. For example, query 400 may be "What is the weather," which may be provided to and processed by multiple automated assistants, including, in some instances, the query processing engine of the primary automated assistant 305. Each of secondary automated assistants determines a response to the query and provides the response to the assistant coordination module 325 of primary automated assistant 305. For example, for the query 400 of "What is the weather," Response 1 may be "The current temperature is 55 degrees," Response 2 may be "It is 55 degrees right now," and Response 3 may be "It is currently sunny." Each of the responses are provided to assistant coordination module 325, which can determine whether to generate a combined response 420 that includes information from one or more of the provided responses.

In some implementations, primary automated assistant 305 can cache results for popular queries. For example, a user may submit a query to query processing engine 330 multiple times over a period of time and the results can be stored. When the same query is submitted again by the user, assistant coordination module 325 can first check stored results to determine, for example, whether a previously stored response to the same query may be utilized to determine a result without requiring the automated assistant to reprocess the query and determine a new response. Also, for example, primary automated assistant 305 may access stored responses for popular queries and the associated responses may be utilized by query processing engine 330 to determine whether to combine the stored response with one or more other responses.

In some implementations, one or more of the secondary automated assistants 405, 410, and 415 may not respond with a response to the query. For example, primary automated assistant 305 may wait for responses for a period of time and not accept any responses that take longer than that period of time. Also, for example, a secondary automated assistant may opt to not respond to a query. In instances where a secondary automated assistant is provided a query for processing and does not provide a response, assistant coordination module 325 may continue to process the received responses to determine whether to combine those responses and disregard the non-responsive automated assistant.

In some implementations, assistant coordination module 325 may cluster one or more of the received responses to determine whether one or more of the responses should be provided to the user as a response to the provided query or whether to combine one or more of the responses into a combined response. In some implementations, each of the responses may be received by the assistant coordination module 325 with a confidence score that is indicative of confidence that the response is responsive to the query 400. The confidence scores may be utilized by assistant coordination module 325 to determine, for each response, whether to include the given response in a combined response. For example, Response 1 may have a confidence score of 0.8 and Response 2 may have a confidence score of 0.3, indicating that confidence that Response 1 is responsive to the query is higher than confidence that Response 2 is responsive to the query. In some implementations, assistant coordination module 325 may discard any responses that are received that have a confidence score below a threshold. For example, if Response 2 does not have a confidence score that satisfies a threshold but Responses 1 and 3 have a threshold confidence score, assistant coordination module 325 may determine that combined response 420 can include information from Response 1 and Response 3 but not from Response 2.

In various implementations, responses can be processed to identify a semantic property that is included in a given response. Further, an embedding (e.g., a word2vec representation) of the identified semantic property can be generated for a response and compared to embeddings of the semantic labels associated with the other responses (e.g., respective embedding representations). Further, it may be determined that the semantic property matches a given embedding, of the plurality of embeddings of the respective semantic labels of other responses, based on the comparison. For example, assume the embeddings are word2vec representations. In this example, a cosine distance between the word2vec representation of the semantic property and each of the word2vec representations of the respective semantic labels can be determined, and a given semantic label that is associated with a respective cosine distance that satisfies a distance threshold can be utilized to determine the semantic property of the spoken utterance matches the given semantic label that is, for example an exact match or soft match.

Figure 4B:
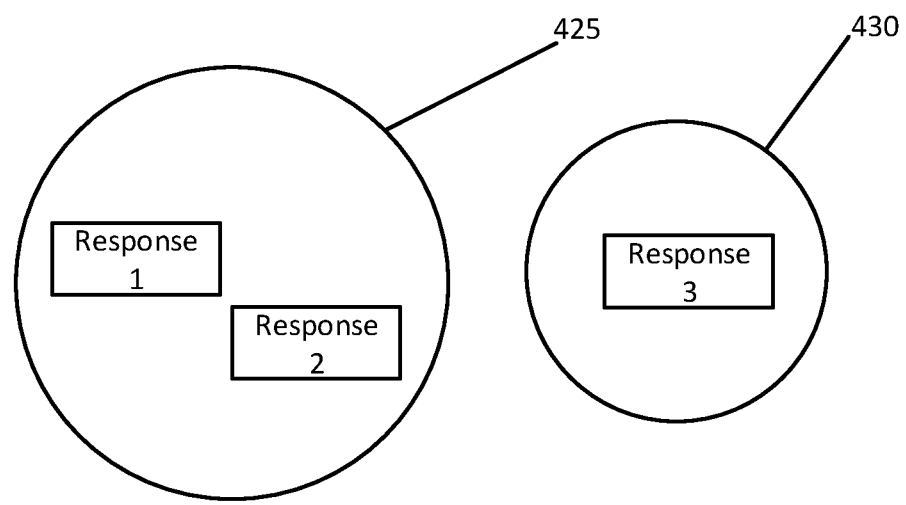
FIG. 4B illustrates combining automated assistant responses into clusters for determining whether to combine the responses.

When two or more responses are compared and determined to be within a threshold similarity, assistant coordination module 325 may cluster responses. Referring to FIG. 4B, a first cluster 425 includes Response 1 and Response 2, and second cluster 430 includes Response 3. For the query "What is the weather," Response 1 may be "The current temperature is 55 degrees" and Response 2 may be "The temperature is 55 degrees," both of which may have vector representations that are close in vector space (i.e., include similar information). Response 3 may be "It is currently sunny," which may have a vector representation that is not close to the vectors representing Response 1 and Response 2 (i.e., includes different information).

In some implementations, assistant coordination module 325 may determine a confidence score for each of the clusters. In some instances, one or more of the received responses may be provided with a confidence score that is indicative of confidence of the automated assistant that the response is responsive to the query. The confidence scores of the responses of a cluster may be utilized to determine a confidence score for the cluster. For example, each of Response 1 and Response 2 may be provided with a confidence score and assistant coordination module 325 may determine a confidence score for first cluster 425 by averaging the confidence scores of Response 1 and Response 2, weighting averages based on one or more factors, selecting one of the confidence scores of the cluster 425 as the confidence score of the cluster, and/or one or more other techniques to utilize the confidence scores of the responses to determine a cluster confidence score.

In some implementations, assistant coordination module 325 may determine whether to combine one or more of the responses. In some instances, assistant coordination module 325 may determine whether a response, or a cluster of responses, has a confidence score that satisfies a threshold. For example, if Response 1 has a confidence score that exceeds a threshold, but Response 2, Response 3, first cluster 425, and second cluster 430 do not, assistant coordination module 325 can determine that only Response 1 should be provided to the user (i.e., not enough confidence for any other potential combined responses). In some implementations, assistant coordination module 325 may determine that a cluster has a confidence score that satisfies a threshold. For example, assistant coordination module 325 may determine that the confidence score of first cluster 425 satisfies a threshold and that Response 1 and Response 2 should be combined into a combined response. In some implementations, assistant coordination module 325 may determine that multiple clusters have confidence scores that satisfy a threshold and may be combined into a single response. For example, if both first cluster 425 and second cluster 430 have confidence scores that satisfy a threshold, assistant coordination module 325 may determine that at least some portion of Response 1, Response 2, and/or Response 3 should be combined into a combined response.

In some implementations, primary automated assistant 305 may determine whether to combine responses based on information that is included in the response and/or the query. For example, for a query of "What is the cost of a new phone from Manufacturer 1," primary automated assistant 305 may determine that the best response will likely be provided by an automated assistant from Manufacturer 1 and determine that a response from that automated assistant is likely to be the best response and not to combine it with other responses. Additionally or alternatively, primary automated assistant 305 may determine that the response from the automated assistant of Manufacturer 1 should be included in any combined response that is provided to the user.

Once assistant coordination module 325 determines to provide a combined response, combined response generator 345 may determine a combined response based on the received responses. In some implementations, a combined response may include one or more terms from a first response from a first automated assistant and one or more terms from a second response from a second automated assistant. Referring again to FIG. 4B, Response 1 and Response 2, both of which are clustered together based on similarity between the results, may be combined into a single response. For example, a first automated assistant may provide Response 1 of "The weather today will be 55 degrees," a second automated assistant may provide Response 2 of "The temperature is 55 degrees," and a third automated assistant may provide Response 3 of "The weather is sunny." Response 1 and Response 2 may be combined by combined response generator 345 into a combined response of "The weather right now is 55 degrees." In some implementations, multiple clusters may be combined into a single response that includes the information from the responses of each of the clusters. For example, referring again to FIG. 4B and the example above, a response representative of cluster 425 (e.g., "The weather right now is 55 degrees") can be combined with Response 3 to result in a response of "The weather right now is 55 degrees and sunny." In this instance, the resulting response includes more information than any of the responses alone and objectively provides a threshold degree of information gain.

After the combined response has been generated, it may be provided to the user. In some implementations, the response may be provided by the primary automated assistant 305. For example, for a given combined response of "The weather today is sunny and 55 degrees," the primary automated assistant 305 can provide, via microphone 320, the response to the user. In some implementations, the response may be provided with an indication of the automated assistant that determined the response. For example, for the same combined response, the primary automated assistant 305 may provide, via microphone 320, an audio response of "Assistant 1 says that the weather will be sunny and Assistant 2 says that it will be 55 degrees today," indicating that Assistant 1 provided a response of "The weather will be sunny" and Assistant 2 provided a response of "The temperature today will be 55 degrees."

In some implementations, one or more secondary automated assistants may provide a portion of the combined response. For example, referring again to FIG. 3, primary assistant 305 may generate a response of "The temperature today is 55 degrees" and provide an audio response via microphone 320. Once the response has been provided, the primary automated assistant 305 can provide an indication (e.g., an audio signal, an indication via API 345) to secondary assistant 310 to provide a second portion of the response, such as "The weather will be sunny today." In those instances, because each automated assistant provides the portion of the response that it generated, the user can be made aware of the source of each portion of the combined response.

In some implementations, one or more of the secondary assistants may provide a response that includes one or more actions. For example, a user may utter a query of "Tell me about Restaurant A" and the primary automated assistant may provide the query to Assistant 1, which can, in response, provide a map to Restaurant A via a graphical interface of the device that is executing Assistant 1. Further, the primary automated assistant 305 can provide the query to Assistant 2, which can, in response, provide a website via a graphical interface of the device that is executing Assistant 2 (e.g., client device 302) that can allow a user to make a reservation at Restaurant A.

In some implementations, a user may be provided with one or more indications of the automated assistants that determined responses and/or that processed the query to generate a response. For example, the user may be provided with an icon via one or more graphical interfaces that indicates which automated assistants are being provided the query, processing the query, and/or providing responses to the query. In some implementations, the indications may be provided via the client device 301 and/or via one or more other devices in communication with the primary automated assistant 305.

In some implementations, the user may provide feedback regarding the provided combined response. For example, after a user has been provided a combined response, the user may be further prompted to provide feedback regarding how responsive the response was to the submitted query. The feedback can be used to determine whether a combined response was accurate, responsive, included appropriate information, and/or other possible issues that a user may have with a provided combined response. The feedback can be utilized to refine the assistant coordination module 325 so that future combined responses are determined only when user feedback is positive for similar combined responses. As an example, a user may provide negative feedback for a combined response that includes information from Assistant 1 and Assistant 2 that indicates that the information from Assistant 2 was not useful. For future similar queries, assistant coordination module 325 may exclude the information received from Assistant 2 and instead provide only the Assistant 1 response information.

Figure 5:
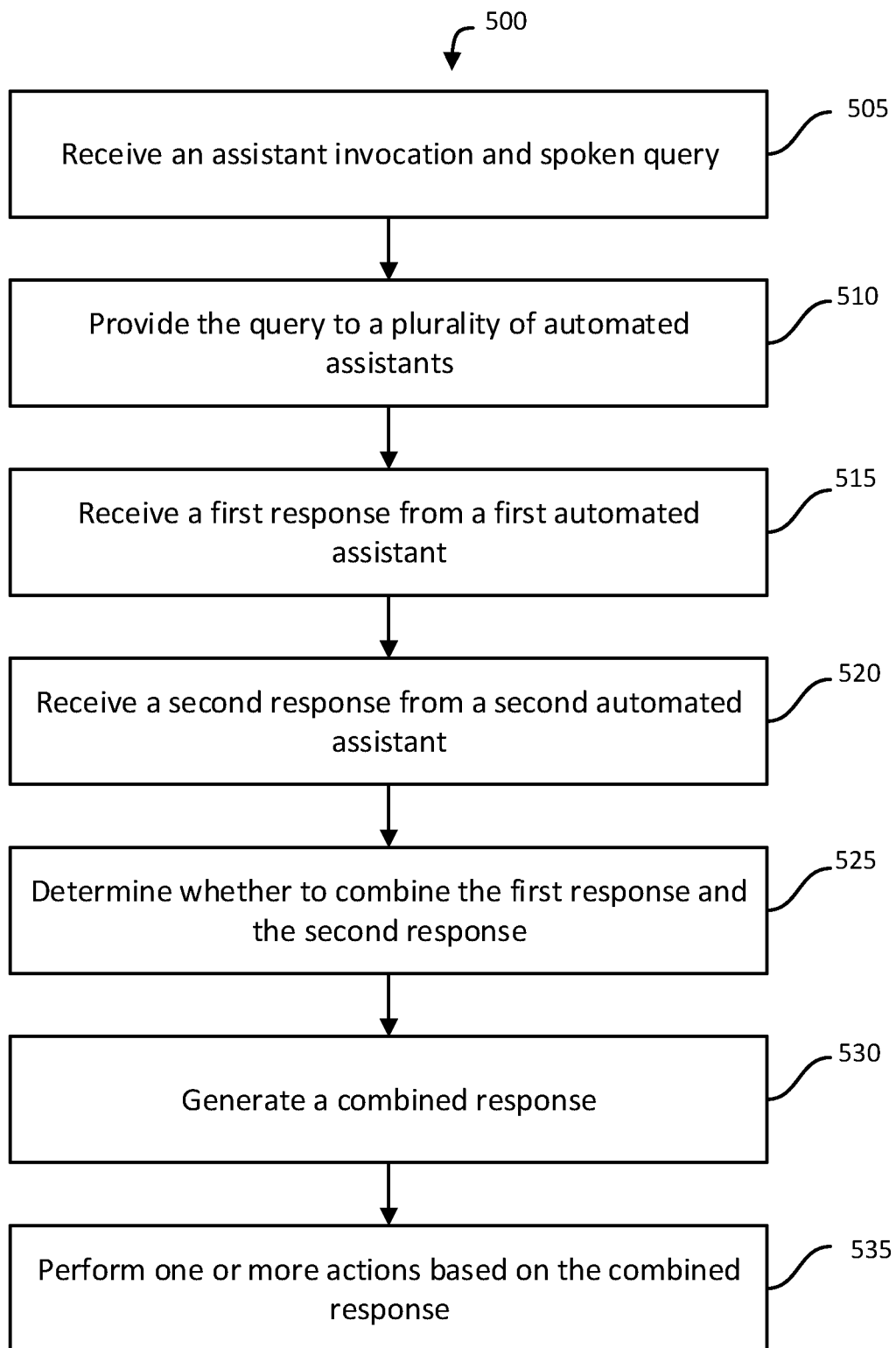
FIG. 5 depicts a flowchart illustrating an example method according to various implementations disclosed herein.

FIG. 5 depicts a flowchart illustrating an example method 500 of combining responses of multiple automated assistants to cause one or more actions to be performed. For convenience, the operations of the method 500 are described with reference to a system that performs the operations. This system of method 500 includes one or more processors and/or other component(s) of a client device. Moreover, while operations of the method 500 are shown in a particular order, this is not meant to be limiting. One or more operations may be reordered, omitted, or added.

At step 505, a spoken query is received following an assistant invocation by a user. The assistant invocation is not specific to any particular automated assistant and therefore does not invoke a particular automated when detected. For example, referring to FIG. 2, an invocation phrase can be "OK Assistant," which does not invoke first automated assistant 215, second automated assistant 220, nor third automated assistant 245. The invocation phrase and the query may be captured by a component that shares one or more characteristics with microphone 225 and/or microphone 230. In some implementations, each of the automated assistants may utilize a microphone of its respective client device to capture the query. In other implementations, the microphone of a single device may capture the audio data that includes the query.

At step 510, an indication of the query is provided to the plurality of automated assistants. For example, an API of one of the automated assistants may be utilized to provide the query to the automated assistant, either as audio or as a text transcription of the audio data that includes the query. Also, for example, one or more devices that captured the query in audio data may provide an indication of the query via an inaudible signal that can be detected by one or more of the devices that is executing an automated assistant. Referring again to FIG. 2, microphone 225 can initially capture the audio that includes the query, and a speaker of client device 105 can broadcast the query (either as processed audio or a textual representation of the audio) via a speaker that may be captured by microphone 230 for further processing by third automated assistant 245.

At step 515, a first response to the query is received from a first automated assistant. At step 520, a second response to the query is received from a second automated assistant. In some implementations, the first response and the second response are received by a component that shares one or more characteristics with secondary assistant 310. For example, a first response may be determined by a first secondary automated assistant via a query processing engine 340 that determined a response that is responsive to the query that was received at step 505, and further a second response is received from a second secondary automated assistant that determined a response that is responsive to the query. In some implementations, the queries are provided to a component that shares one or more characteristics with primary assistant 330 via, for example, API 390 and/or an audio signal that is broadcast via speaker 370 and captured by microphone 320.

In some implementations, the response may be a textual response, such as "The weather today is sunny." In some implementations, the response may indicate one or more other actions that may be taken in response to the query, such as navigating to a website, making a phone call, providing directions to a location, and/or other responses that may otherwise be provided by an automated assistant. For example, for a query that includes a request for information regarding a location, an automated assistant may provide a response that includes a webpage for the location and/or an address for the location.

At step 525, one or more components, such as a component that shares one or more characteristics with assistant coordination module 325 of FIG. 3, determines, based on the first response and the second response, whether to combine the first response and the second response. In some implementations, the responses may be provided by the secondary automated assistants with a confidence score that is indicative of the confidence that the response is responsive to the query. The confidence scores may be utilized to determine whether the responses (or which responses) are objectively most beneficial to the user based on the likely accuracy of the responses as well as the information that is included in the responses.

At step 530, a combined response is generated based on the first response and the second response. The combined response can include portions of the first response and the second response that can be provided to the user as a single response. For example, a first response may be "The weather is sunny" and a second response may be "The temperature is 55 degrees." A component of the primary automated assistant can combine the two responses into a combined response of "The weather is sunny and 55 degrees," which includes information from both the first response and the second response. In some implementations, the responses may be clustered based on similarity and a response can be selected from each of the resulting clusters, as illustrated in FIG. 4B and described herein.

At step 535, one or more actions are performed based on the combined response. In some implementations, the resulting action can include providing a spoken response to the user via one or more speakers of devices that are executing one or more of the automated assistants. For example, a primary automated assistant can provide the combined response in its entirety (e.g., "The weather is sunny and 55 degrees," or multiple automated assistants may each provide a portion of the combined response (e.g., "The weather is sunny" provided via a first device speaker and "The temperature is 55 degrees" provided via a second device speaker).

Figure 6:
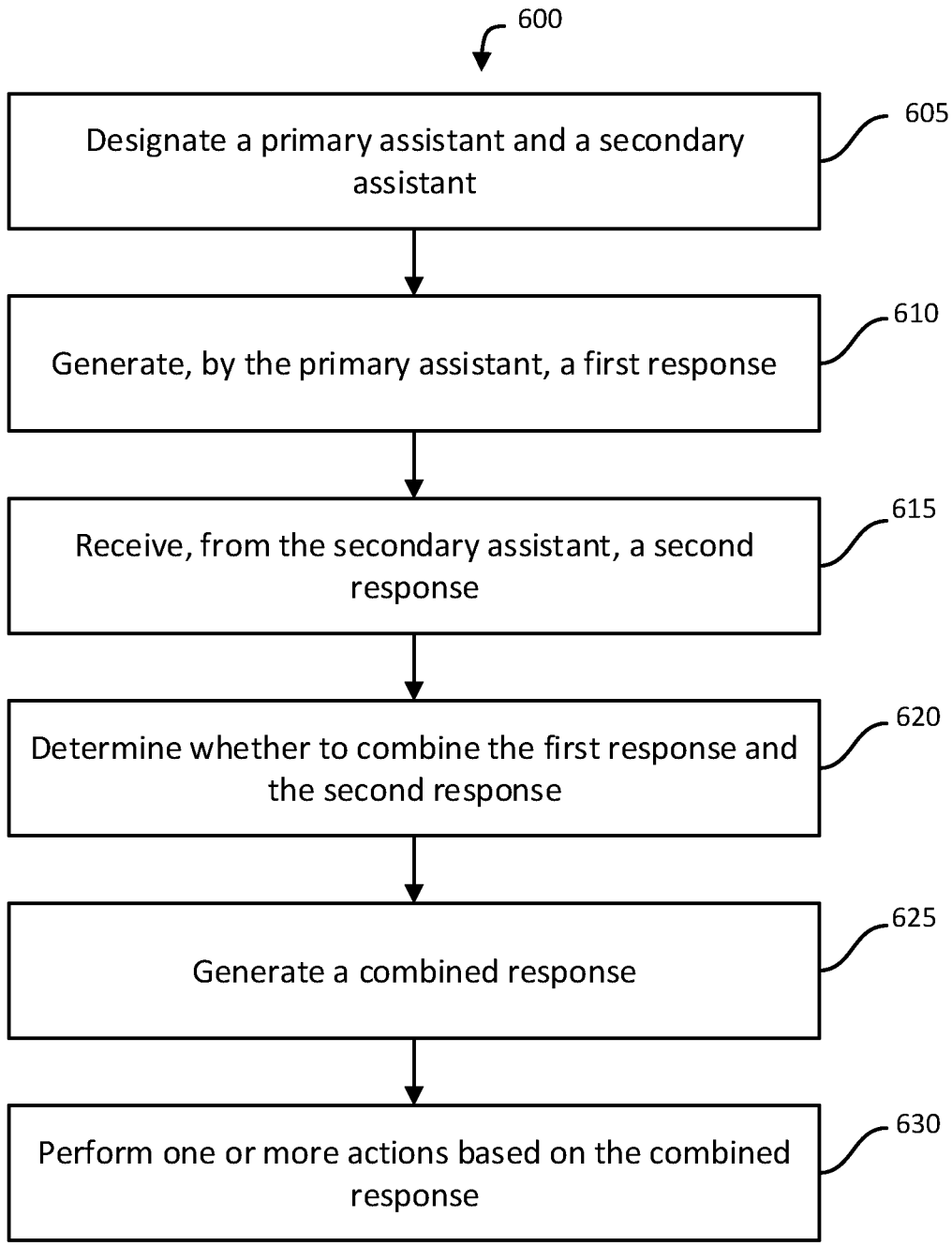
FIG. 6 depicts a flowchart illustrating another example method according to various implementations disclosed herein.

FIG. 6 depicts a flowchart illustrating another example method 600 of combining responses of multiple automated assistants to cause one or more actions to be performed. For convenience, the operations of the method 600 are described with reference to a system that performs the operations. This system of method 600 includes one or more processors and/or other component(s) of a client device. Moreover, while operations of the method 500 are shown in a particular order, this is not meant to be limiting. One or more operations may be reordered, omitted, or added.

At step 605, a first automated assistant is designated to be a primary assistant and a second automated assistant is designated to be a secondary assistant. The primary assistant can, in some instances, be an automated assistant that is capable of generating a response to a query. For example, referring to FIG. 3, the primary assistant can share one or more characteristics with primary assistant 305, as described herein. In some implementations, determining an automated assistant is a primary automated assistant may include determining which automated assistant is closest to the user when an invocation phrase is uttered. Also, for example, a primary assistant can be determined based on the invocation phrase that was uttered by the user (e.g., "OK Assistant 1" can indicate that the user has a preference for Assistant 1 as the primary assistant). Also, for example, the primary assistant can be determined based on user preferences, past user activity, and/or one or more other factors described herein.

At step 610, a first response to the query is generated by the primary automated assistant. At step 615, a second response to the query is received from the secondary automated assistant. In some implementations, the first response may be generated by a component that shares one or more characteristics with primary assistant 305 and the second response can be received by a component that shares one or more characteristics with secondary assistant 310. For example, a first response can be generated by the primary assistant 305 via a query processing engine 330 that is responsive to the query, and further a second response can be received from the secondary automated assistant 310 via query processing engine 340. In some implementations, the queries are provided via, for example, API 390 and/or an audio signal that is broadcast via speaker 370 and captured by microphone 320.

At step 620, one or more components, such as a component that shares one or more characteristics with assistant coordination module 325 of FIG. 3, determines, based on the first response and the second response, whether to combine the first response and the second response. In some implementations, the responses may be provided by the automated assistants with a confidence score that is indicative of the confidence that the response is responsive to the query. The confidence scores may be utilized to determine whether the responses (or which responses) are objectively most beneficial to the user based on the likely accuracy of the responses as well as the information that is included in the responses.

At step 625, a combined response is generated based on the first response and the second response. The combined response can include portions of the first response and the second response that can be provided to the user as a single response. For example, a first response may be "The weather is sunny" and a second response may be "The temperature is 55 degrees." A component of the primary automated assistant can combine the two responses into a combined response of "The weather is sunny and 55 degrees," which includes information from both the first response and the second response. In some implementations, the responses may be clustered based on similarity and a response can be selected from each of the resulting clusters, as illustrated in FIG. 4B and described herein.

At step 630, one or more actions are performed based on the combined response. In some implementations, the resulting action can include providing a spoken response to the user via one or more speakers of devices that are executing one or more of the automated assistants. For example, the primary automated assistant can provide the combined response in its entirety (e.g., "The weather is sunny and 55 degrees," or the secondary automated assistant(s) may each provide a portion of the combined response (e.g., "The weather is sunny" provided via a first device speaker and "The temperature is 55 degrees" provided via a second device speaker).

Figure 7:
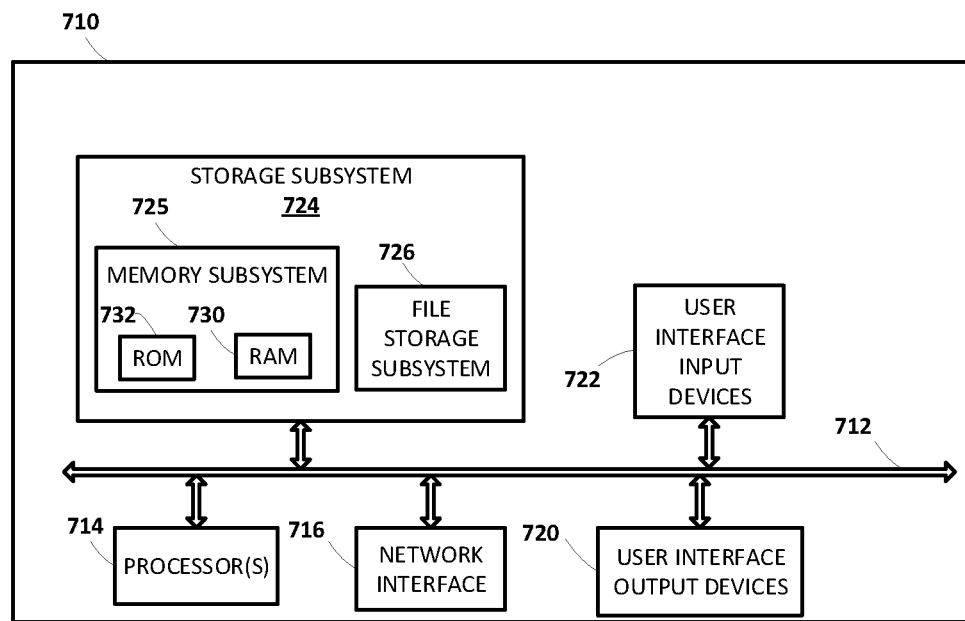
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIG. 5 and FIG. 6, and/or to implement various components depicted in FIG. 2 and FIG. 3.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors is provided and includes receiving a spoken query captured in audio data generated by one or more microphones of a client device, where the spoken query following an assistant invocation by a user, and where the assistant invocation is not specific to any particular one of a plurality of automated assistants. The method further includes providing an indication of the query to the plurality of automated assistants. The method further includes receiving a first response to the query from a first automated assistant of the plurality of automated assistants. The method further includes receiving a second response to the query from a second automated assistant of the plurality of automated assistants. The method further includes determining, based on the first response and the second response, whether to combine the first response and the second response. The method further includes generating, in response to determining to combine the first response and the second response, a combined response based on the first response and the second response. The method further includes causing, in response to receiving the spoken query, one or more actions to be performed based on the combined response.

These and other implementations of the technology disclosed herein can include one or more of the following features.

In some implementations, the method further includes clustering the responses based on similarity between responses of a given cluster, wherein determining whether to combine the responses is based on the clustering of responses. In some of those implementations, generating the combined response includes combining a portion of one or more responses of a first cluster with a portion of one or more responses of a second cluster. In some of those instances, generating the combined response includes combining a portion of one or more responses of a first cluster with a portion of one or more responses of a second cluster. In some of those instances, the method further includes determining a confidence score for each of the clusters, with the confidence score of a given cluster indicative of confidence that the responses of the given cluster are responsive to the spoken query, and the first cluster and second cluster are combined in response to determining that the confidence score satisfies a threshold. In some implementations, generating the combined response includes combining a portion of two or more responses of a cluster.

In some implementations, the method further includes performing automatic speech recognition on the audio data that captures the spoken query to generate a text query, wherein the indication of the query is the text query.

In some implementations, the first the automated assistant is executing, at least in part, on the client device.

In some implementations, the first automated assistant is executing, at least in part, on a second client device.

In some implementations, the one or more actions includes providing the combined response to the user on the client device.

In some implementations, the one or more actions includes providing an indication of the first automated assistant and the second automated assistant to the user.

In some implementations, the spoken query is received by an automated assistant configured to determine responses to a type of query and the indication is provided based on determining that the spoken query is not the type of query.

In some implementations, another method implemented by one or more processors is provided and includes determining, by a first assistant executing at least in part on a client device, that the first assistant is a primary assistant for responding to a spoken utterance and that a second assistant is a secondary assistant for responding to the spoken utterance. The method further includes generating, by the primary assistant, a first response to a spoken query in response to a user providing the spoken query. The method further includes receiving, from the secondary assistant, a second response to the spoken query. The method further includes determining, based on the first response and the second response, whether to combine the first response and the second response. The method further includes generating, in response to determining to combine the first response and the second response, a combined response based on the first response and the second response. The method further includes causing, in response to receiving the spoken query, one or more actions to be performed based on the combined response.

These and other implementations of the technology disclosed herein can include one or more of the following features.

In some implementations, determining that the first assistant is the primary assistant is based on proximity of the client device to the user. In some implementations, the second assistant is executing, at least in part, on a second client device, and wherein the one or more actions includes providing at least a portion of the combined response via the second client device. In some implementations, the combined response includes portions of the first response and the second response.

In some implementations, determining not to use the second response based on the determining whether to provide a combined response. In some of those implementations, the second response is an indication that the second assistant is unable to process the query. In other of those implementations, the second response is an indication of a timeout of response time by the second assistant.

In some implementations, the primary assistant is a preferred assistant based on one more terms of the query.

In some implementations, the method of further includes providing the query to the second assistant, where the query is provided via a human-inaudible indication of the query by the client device that is audible to a secondary client device that is executing, at least in part, the secondary assistant.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    receiving, by an invoked assistant, a query, the query being based on user interface input of a user via a client device that is provided by the user following an invocation of the invoked assistant;
    in response to receiving the query:
        generating, by the invoked assistant:
            a first related query that is related to the query, and
            a second related query that is related to the query and that differs from the first related query;
        providing, by the invoked assistant, the first related query to a first automated assistant of a plurality of automated assistants that are in communication with the invoked assistant;
        providing, by the invoked assistant, the second related query to a second automated assistant of the plurality of automated assistants;
        receiving, by the invoked assistant and from the first automated assistant in response to the invoked assistant providing the first related query, a first response to the first related query;
        receiving, by the invoked assistant and from the second automated assistant in response to the invoked assistant providing the second related query, a second response to the second related query;
        processing, by the invoked assistant, the first response and the second response to generate a combined response that is more concise than the first response and the second response collectively; and causing, by the invoked assistant, rendering of the combined response via the client device.

2. The method of claim 1, further comprising:
determining whether to combine the first response and the second response;
wherein processing the first response and the second response to generate the combined response is performed in response to determining to combine the first response and the second response.

3. The method of claim 2, wherein determining whether to combine the first response and the second response comprises:
comparing the first response and the second response; and
determining whether to combine the first response and the second response based on the comparing.

4. The method of claim 3, wherein comparing the first response and the second response comprises generating a similarity metric that indicates a degree of similarity between the first response and the second response, and wherein determining whether to combine the first response and the second response based on the comparing comprises determining to combine the first response and the second response based on the similarity metric failing to satisfy a threshold.

5. The method of claim 1, further comprising:
generating, by the invoked assistant, an invoked assistant response to the query;
wherein processing the first response and the second response to generate the combined response further comprises processing the invoked assistant response, along with the first response and the second response, to generate the combined response.

6. The method of claim 5, further comprising:
determining whether to combine the first response, the second response, and the invoked assistant response;
wherein processing the first response, the second response, and the invoked assistant response to generate the combined response is performed in response to determining to combine the first response, the second response, and the invoked assistant response.

7. The method of claim 1, wherein processing the first response and the second response to generate the combined response comprises processing the first response and the second response using a sequence to sequence machine learning model and generating the combined response utilizing a generated output sequence from the processing.

8. The method of claim 1, wherein causing rendering of the combined response via the client device comprises causing rendering of the combined response along with rendering of a first indication of the first automated assistant and rendering of a second indication of the second automated assistant.

9. The method of claim 8, wherein the first indication includes a first sound effect and the second indication includes a second sound effect.

10. The method of claim 8, wherein the first indication includes utilizing a first synthesized voice for rendering a portion of the combined response and the second indication includes utilizing a second synthesized voice for rendering an additional portion of the combined response.

11. The method of claim 1, wherein providing, by the invoked assistant, the first related query to the first automated assistant includes providing a human-inaudible indication of the first related query, wherein the human-inaudible indication of the first related query is audible to an additional client device that is executing, at least in part, the first automated assistant.

12. A system, comprising:
memory storing instructions;
one or more processors operable to execute the instructions to:
receive a query generated based on user interface input of a user via a client device;
determine that the query is directed to an invoked assistant;
in response to receiving the query and determining that the query is directed to the invoked assistant:
generate, by the invoked assistant:
a first related query that is related to the query, and
a second related query that is related to the query and that differs from the first related query;
provide, by the invoked assistant, the first related query to a first automated assistant of a plurality of automated assistants that are in communication with the invoked assistant;
provide, by the invoked assistant, the second related query to a second automated assistant of the plurality of automated assistants;
receive, by the invoked assistant and from the first automated assistant in response to the invoked assistant providing the first related query, a first response to the first related query;
receive, by the invoked assistant and from the second automated assistant in response to the invoked assistant providing the second related query, a second response to the second related query;
process, by the invoked assistant, the first response and the second response to generate a combined response that is more concise than the first response and the second response collectively; and
cause, by the invoked assistant, rendering of the combined response via the client device.

13. The system of claim 12, wherein one or more of the processors are further operable to execute the instructions to:
determine whether to combine the first response and the second response;
wherein processing the first response and the second response to generate the combined response is performed in response to determining to combine the first response and the second response.

14. The system of claim 13, wherein in determining whether to combine the first response and the second response one or more of the processors are to:
compare the first response and the second response; and
determine whether to combine the first response and the second response based on the comparing.

15. The system of claim 14, wherein in comparing the first response and the second response one or more of the processors are to generate a similarity metric that indicates a degree of similarity between the first response and the second response, and wherein in determining whether to combine the first response and the second response based on the comparing one or more of the processors are to determine to combine the first response and the second response based on the similarity metric failing to satisfy a threshold.

16. The system of claim 12, wherein one or more of the processors are further operable to execute the instructions to:
generate, by the invoked assistant, an invoked assistant response to the query;
wherein in processing the first response and the second response to generate the combined response one or more of the processors are further to process the invoked assistant response, along with the first response and the second response, to generate the combined response.

17. The system of claim 16, wherein one or more of the processors are further operable to execute the instructions to:
determine whether to combine the first response, the second response, and the invoked assistant response;
wherein processing the first response, the second response, and the invoked assistant response to generate the combined response is performed in response to determining to combine the first response, the second response, and the invoked assistant response.

18. The system of claim 12, wherein in processing the first response and the second response to generate the combined response one or more of the processors are to process the first response and the second response using a sequence to sequence machine learning model and generate the combined response utilizing a generated output sequence from the processing.

19. The system of claim 12, wherein in causing rendering of the combined response via the client device one or more of the processors are to cause rendering of the combined response along with rendering of a first indication of the first automated assistant and rendering of a second indication of the second automated assistant.

20. The system of claim 12, wherein the first indication includes a first sound effect and the second indication includes a second sound effect.

* * * * *